(12) United States Patent
Menten

(10) Patent No.: US 8,320,372 B2
(45) Date of Patent: Nov. 27, 2012

(54) PROCESSING OF PACKET FRAGMENTS

(75) Inventor: Lawrence E. Menten, Upper Saddle River, NJ (US)

(73) Assignee: Alcatel Lucent, Paris (FR)

( * ) Notice: Subject to any disclaimer, the term of this patent is extended or adjusted under 35 U.S.C. 154(b) by 549 days.

(21) Appl. No.: 12/143,914

(22) Filed: Jun. 23, 2008

(65) Prior Publication Data

US 2009/0316698 A1    Dec. 24, 2009

(51) Int. Cl.
*H04L 12/28* (2006.01)
(52) U.S. Cl. ....................................... 370/389
(58) Field of Classification Search .................... 370/389
See application file for complete search history.

(56) References Cited

U.S. PATENT DOCUMENTS

| | | | |
|---|---|---|---|
| 6,795,866 B1 * | 9/2004 | Mankude et al. | 709/238 |
| 7,065,086 B2 | 6/2006 | Basso et al. | |
| 2003/0039249 A1 | 2/2003 | Basso et al. | 370/394 |
| 2003/0039250 A1 * | 2/2003 | Nichols et al. | 370/394 |
| 2003/0126272 A1 * | 7/2003 | Corl et al. | 709/230 |
| 2005/0286517 A1 | 12/2005 | Babbar et al. | 370/389 |
| 2006/0106946 A1 * | 5/2006 | Agarwal et al. | 709/250 |
| 2008/0043741 A1 * | 2/2008 | Kuo | 370/394 |

FOREIGN PATENT DOCUMENTS

EP    1 109 373 A2    6/2001

OTHER PUBLICATIONS

"Detecting Evasion Attacks at High Speeds without Reassembly," by George Varghese et al., Applications, Technologies, Architectures, and Protocols for Computer Communication: Proceedings of the 2006 Conference on Applications, Technologies, Architectures, and Protocols for Computer Communications, Sep. 11, 2006, pp. 327-338, XP040046600.

* cited by examiner

*Primary Examiner* — Mark Rinehart
*Assistant Examiner* — Matthew Hopkins
(74) *Attorney, Agent, or Firm* — Mendelsohn, Drucker & Associates, P.C.; Steve Mendelsohn; David L. Cargille

(57) ABSTRACT

In one embodiment, the present invention is a technique for processing fragments received at a node (e.g., a router) in a datagram-based communication system in order to provide a wide range of protection against potential fragment-based attacks. Received fragments are examined as they are received to verify that they do not overlap one another and that the fragment sequence does not exploit common weaknesses in IP packet-reassembly algorithms. Valid fragment sequences that represent potential threats to the receiver can be reordered and/or fully or partially re-assembled and re-fragmented into a fragment sequence that eliminates or reduces the threat to the receiver. Fragmented sequences that represent a likely attack are blocked, as are subsequent fragments of the associated packet.

18 Claims, 9 Drawing Sheets

300

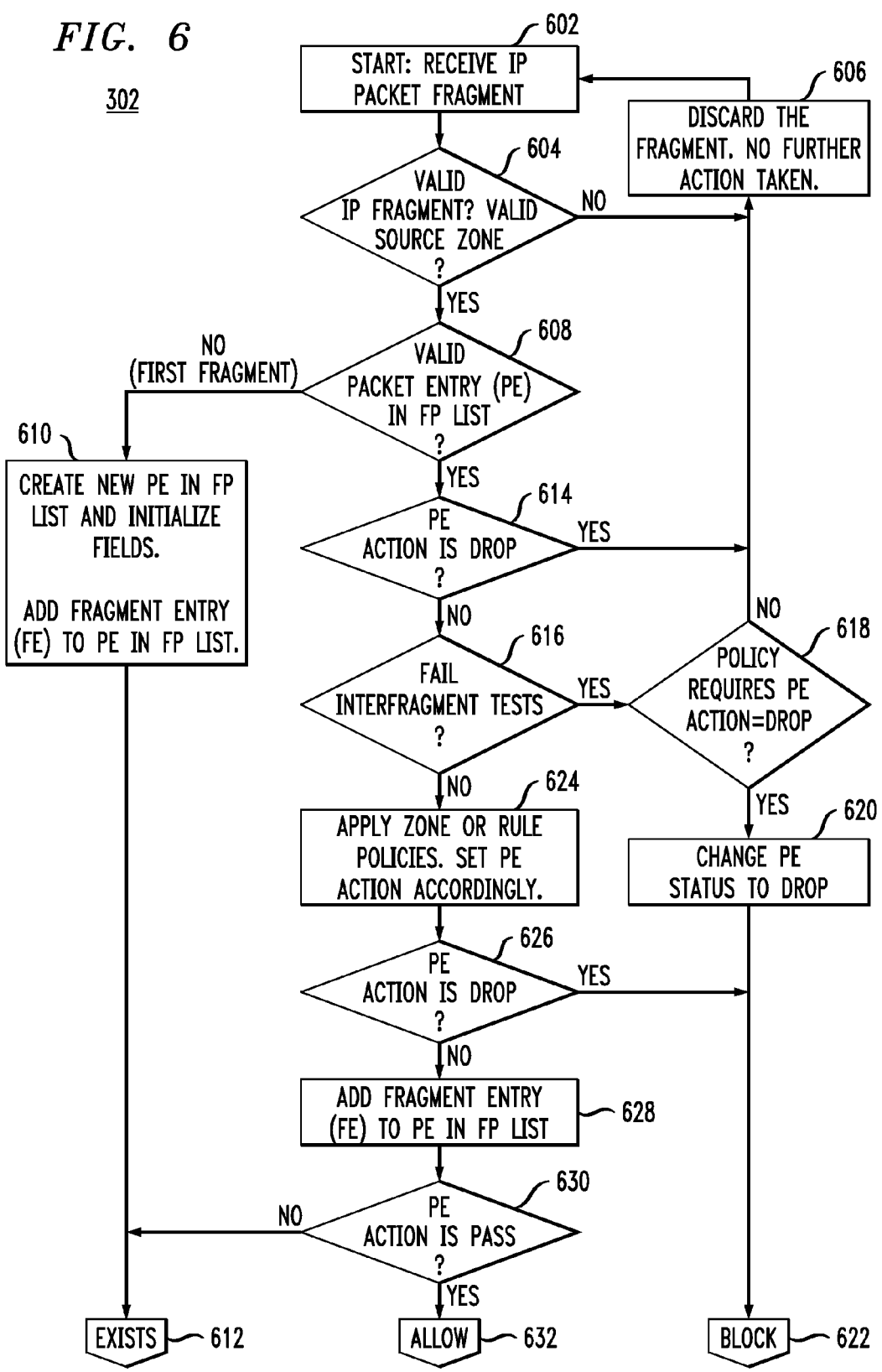

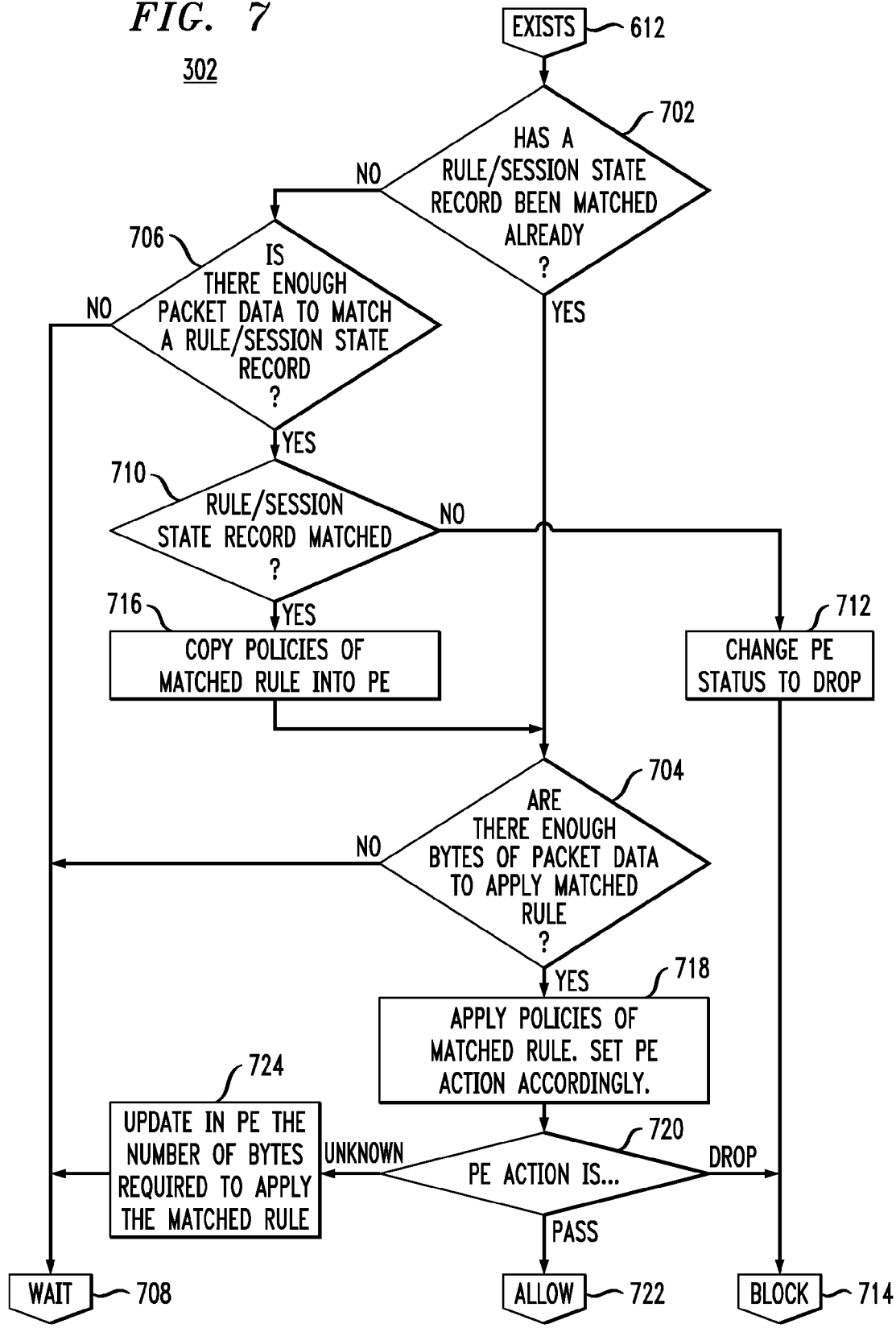

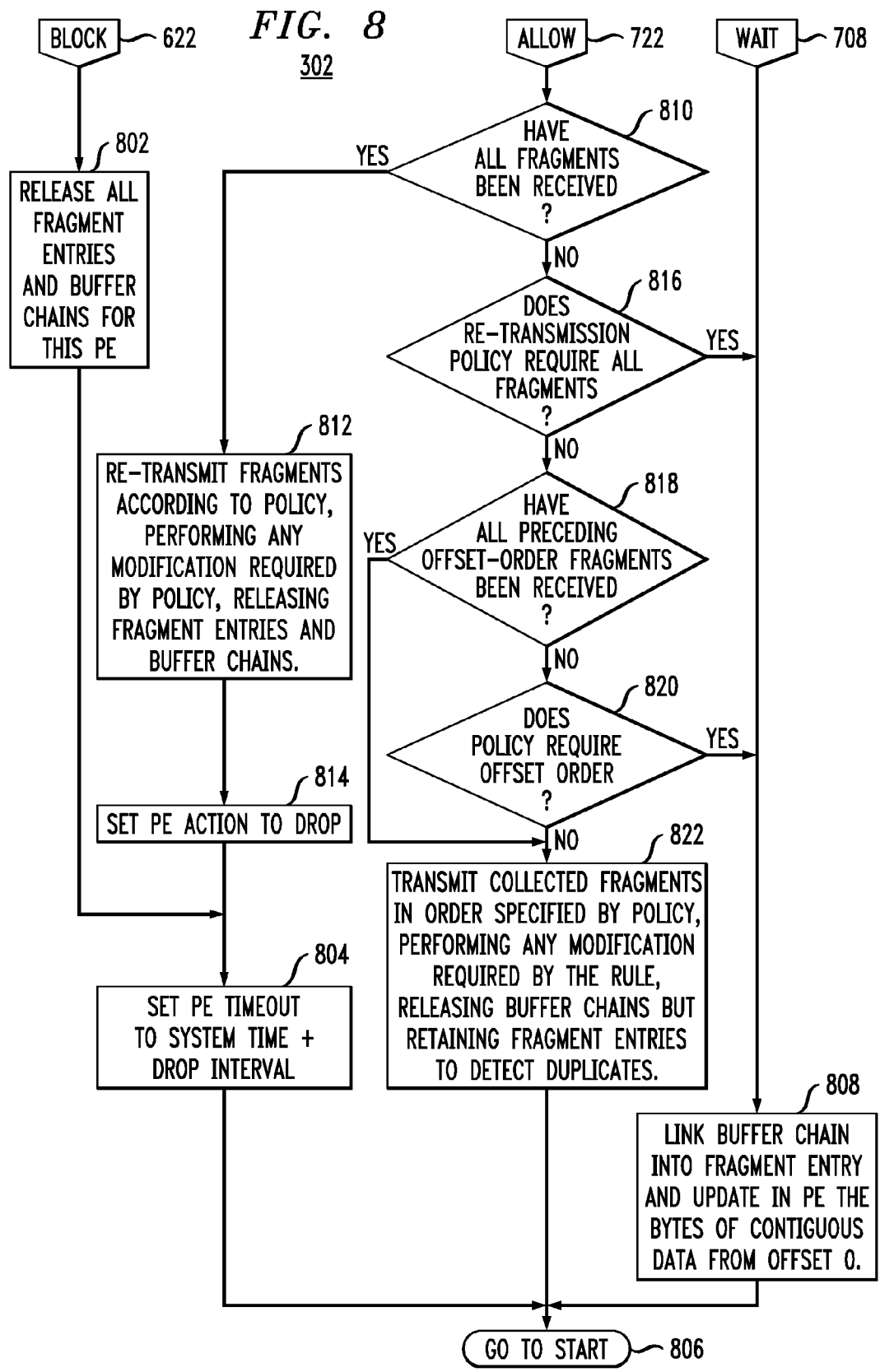

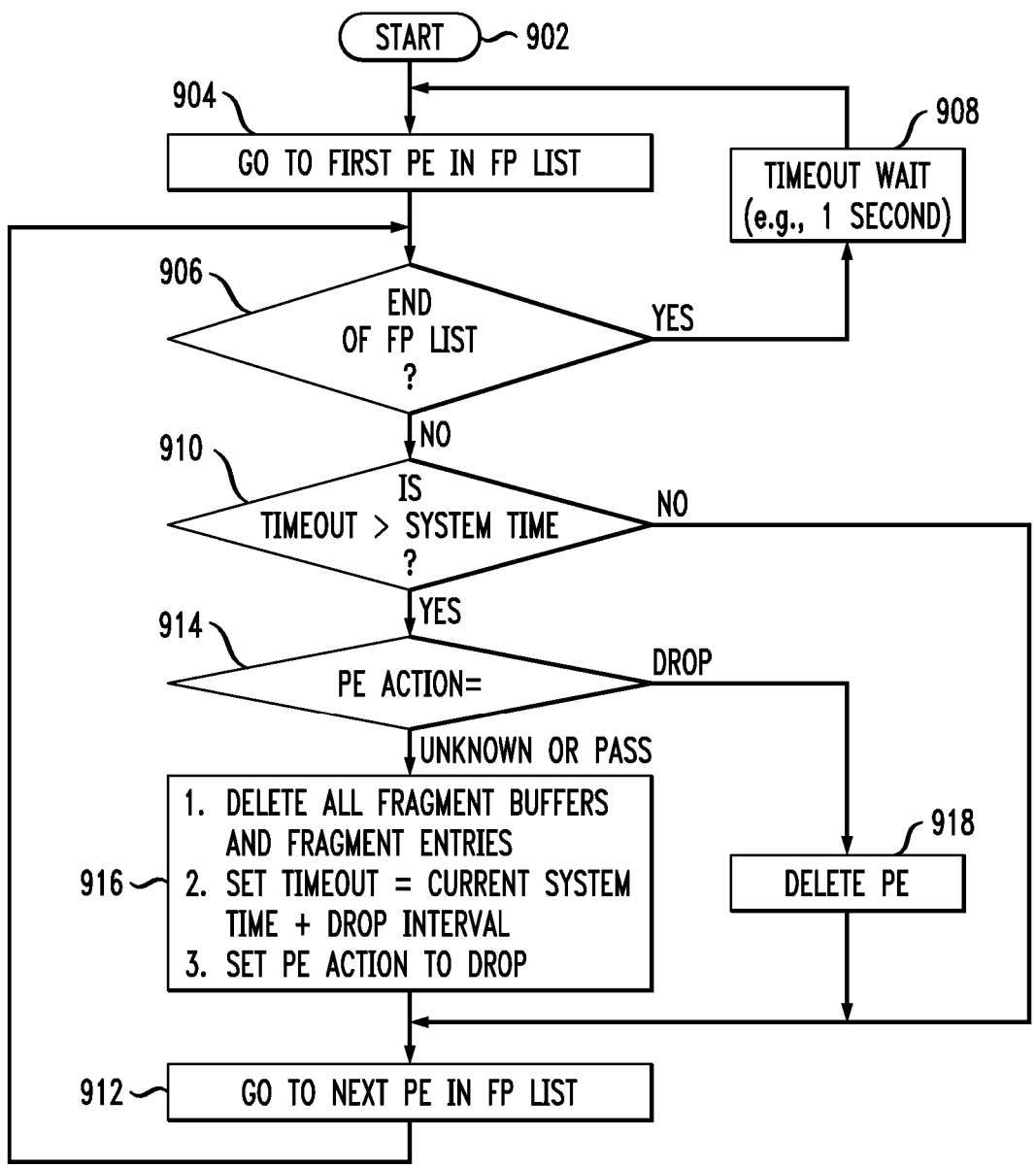

PROCESSING OF PACKET FRAGMENTS

BACKGROUND OF THE INVENTION

1. Field of the Invention

The invention relates to communications, specifically the routing and filtering of packets within digital communications networks.

2. Description of the Related Art

On a packet-switched network such as the Internet, traffic between a source and a destination is in the form of one or more discrete units, or datagrams. The creation of datagrams is typically performed by a number of software protocols working in coordination. These protocols are typically visualized as a vertical stack of layers. Each layer/protocol accepts a datagram from an adjacent layer/protocol, performs a specific set of one or more tasks on that datagram, and then delivers the resulting datagram to the next layer/protocol in the stack.

FIG. 1 is a graphical depiction of the five-layer protocol stack of the Internet, how the protocols in the stack format datagrams, how those protocol layers correspond to objects in the real world, and how datagrams are routed from source to destination via the Internet.

By convention, protocol layers are numbered from bottom to top, with physical layer 102 being first, datalink layer 104 second, network layer 106 third, transport layer 108 fourth, and application layer 110 fifth and last.

In operation, data to be transmitted from a source 112 to a destination 150 first travels through protocol layers 110-102 from the top down at source 112. Data originates at the source application layer. For example, source web-server software application 114 running on web-server computer 126 generates Hypertext Transfer Protocol (HTTP) application data 116 destined for destination 150, in this case, web-browser software application 160 running on laptop computer 156.

Web-server application software 114 hands application data 116 to transport layer 108, in this example, a Terminal Control Protocol (TCP) layer. The TCP layer's responsibility is to (1) determine whether application data 112 is accurately transmitted from source 112 to destination 150 and (2) initiate a resend if it is not. Since there may be multiple pieces of application software running on both source and destination, TCP layer 108 distinguishes different applications by using specified TCP port numbers, e.g., source port 118 and destination port 158. At source 112, TCP layer 108 treats application data 116 (in this case, HTTP data) as TCP payload 122 and encapsulates that payload 122 by prepending a TCP header 120 that contains, inter alia, TCP source port number 118 and TCP destination port number 158. In general, for a particular protocol layer, the term "payload" refers to that portion of a datagram that is not part of the datagram header or footer (if present). Thus, the payload of one layer will include the payload, header, and footer (if present) of the next higher layer in the protocol stack.

TCP hands resulting TCP datagram 124 to network layer 106, in this example, an Internet Protocol (IP) layer. The IP layer's task is to route IP datagrams from one network address to another. IP layer 106 treats TCP datagram 124 as IP payload 130 and encapsulates that payload by prepending an IP header 128, which contains, inter alia, source and destination IP addresses. The result is IP datagram 132.

Next, IP layer 106 hands IP datagram 132 to datalink layer 104, the layer charged with moving data from one hardware device to another. In this example, the datalink protocol is Ethernet, and the Ethernet device is an Ethernet card 134 within web-server computer 126. Datalink layer 104 treats IP datagram 132 as Ethernet payload 138 and encapsulates that payload by prepending Ethernet header 136 and appending Ethernet footer 140. Datalink layer 104 then sends resulting Ethernet datagram 142 to the Internet 146 over physical layer 102, in this example, a copper cable 144 conforming to the 10BaseT physical-layer specification.

Connecting source 112 and destination 150 is the Internet 146. The Internet 146 can be visualized as a collection of interconnected routing applications (routers) 148. Routers 148 independently route each datagram from source to destination based, in part, on information located within the datagram. As part of the routing process, routers may make modifications to the datagrams.

Once Ethernet datagram 142 has transited the Internet 146, it ascends through the protocol stack at destination 150 in reverse order, shedding headers and footers (de-encapsulation) until original application data 116 is presented to destination application 160. In particular, Ethernet cable 152 delivers Ethernet datagram 142 to datalink (Ethernet) device 154. Ethernet device 154 removes Ethernet header 136 and Ethernet footer 140 and hands IP datagram 132 to network (IP) layer 106. Network (IP) layer 106 removes IP header 128 and delivers TCP datagram 124 to transport (TCP) layer 108. Lastly, transport (TCP) layer 108 discards TCP header 120 and delivers application data 116 to application 160.

FIG. 2 is an exploded view of datagram 132 of FIG. 1 and illustrates the results of IP packet fragmentation. Each of IP header 128 and TCP header 120 comprises a number of fields. Source TCP Port field 220 identifies source port 118, which is used to route responses back to source application 114. Destination TCP Port field 222 identifies destination port 158, which is used to route application data 116 to application software 160 on destination computer 156.

IP header 128 comprises, among other fields, Total Length field 208, which indicates the size in bytes of IP datagram 132. Source IP Address field 202 and Destination IP Address field 204 contain the IP addresses of source and destination devices 126 and 156, respectively.

During the course of routing IP datagrams, it is occasionally necessary to break such datagrams into a sequence of smaller IP datagrams, for example, to meet the constraints of an intermediate network or router in the transmission path. This operation is called IP packet fragmentation. An unfragmented IP datagram is called a packet, and each smaller IP datagram that results from breaking up a packet is called a fragment. As referred to herein, the offset order of a set of fragments belonging to a single packet is the order in which those fragments occurred in that packet.

Each fragment possesses a complete IP header, but, typically, only offset-0 fragment 246 (i.e., the first fragment of a fragmented packet) possesses TCP header 120 from original packet 132. The opposite of IP fragmentation is reassembly, that is, the reconstitution of a packet from its constituent fragments.

An important characteristic of a packet-switched network, such as the Internet, is that each router routes a particular datagram along what that router has determined is the optimal transmission path at that particular point in time. As a consequence, the transmission path taken by a datagram transmitted by a particular source for a particular destination may differ from the transmission paths taken by other datagrams transmitted by the same source for the same destination at different points in time. Thus, it is possible for a source to transmit datagrams in a particular sequence, e.g., offset order, to a destination, and for those same datagrams to arrive at the destination in a different sequence, referred to herein as the received sequence. Furthermore, a destination may receive fragments for a particular packet interleaved with datagrams corresponding to other packets. Yet further, one or more fragments might never arrive at their destinations at all.

Thus, a destination needs to determine (1) which fragments belong to which packets, (2) whether or not all fragments for a particular packet have been received, and (3) the offset order of a set of fragments belonging to a particular packet. This information is found in Identification field 206, Fragment Offset field 210, and More Fragments field 212 of IP header 128.

Identification field 206 is set to a value (e.g., 216, for this example) that is unique for that source-destination pair for the time the packet will be active on the Internet. All fragments of a particular packet will inherit the Identification value of the packet.

Fragment Offset field (FO) field 210 indicates the offset of this fragment relative to the beginning of the data portion of the IP payload in units of eight bytes. In other words, a fragment's fragment offset value indicates where in the data portion of the original packet the payload of this fragment occurred. Thus, fragment offset values can be used to resequence out-of-offset-order received fragments into their proper offset order. According to RFC 791, the Internet Protocol specification, the offset for an unfragmented packet must be 0. The offset for the first fragment of a fragmented packet (referred to herein as the offset-0 fragment) is also 0.

More Fragments field (MF) 212, a 1-bit true/false field, indicates whether or not this datagram is followed (in offset order) by another datagram having the same Identification value. RFC 791 specifies an MF value of 0 (false) for a packet and for the last offset fragment of a packet. For all fragments but the last offset fragment of a packet, RFC 791 specifies an MF value of 1 (true).

If, for example, IP packet 132 (having a total length of 324 bytes and an IP header length of 20 bytes) must transit a network with an Maximum Transmission Unit (MTU) of 148 bytes, then IP packet 132 may be broken up into three fragments: 246, 266, and 286, each of which is an IP datagram in its own right. Specifically, the 304 bytes of IP data 124 (including TCP header 120) will be broken up into three pieces (120 and 244, 264, and 284) of 128 bytes, 128 bytes, and 48 bytes, respectively. Each piece will then be prepended with its own IP header (230, 250, 270), which, for the purposes of this illustration, is assumed to be 20 bytes long, yielding fragments 246 (148 bytes), 266 (148 bytes), and 286 (68 bytes).

Some of the fields in fragment headers 230, 250, and 270 will be identical to the corresponding fields in packet IP header 128. Specifically, Source IP Address (202, 232, 252, 272), Destination IP Address (204, 234, 254, 274), and Identification (206, 236, 256, 276) will be identical.

Other fields in fragment headers 230, 250, and 270 will differ from the corresponding fields in packet IP header 128. Total Length fields 238, 258, and 278 will change to reflect the effects of fragmentation. Similarly, Fragment Offset fields 240, 260, and 280 will now reflect the fragments' offset order, in 8-byte blocks. Lastly, More Fragments fields 242, 262, and 282 now indicate that (1) fragmentation has occurred and (2) that fragment 286 is the last offset fragment.

Fragmentation complicates datagram routing. Routers routinely require data that is not duplicated from fragment to fragment, e.g., TCP header information. Consequently, a router may receive a fragment that it will be unable to route utilizing solely the information contained within that fragment. Furthermore, some routing operations require a router to modify packet data (e.g., Network Address Translation), and thus a router may need to modify one or more fragments of a packet. However, fragmentation complicates more than just datagram routing.

In addition to the efficient routing of IP datagrams, a second concern of many who use the Internet today is network security. Routinely, datagrams are manipulated and purposefully introduced onto the Internet to disrupt communications or to gain unauthorized access to protected devices and protected network services. Such "attacks" come in many different forms. One example is the denial-of-service attack, where a router or other device is deliberately flooded with datagrams in order to compromise or even prevent legitimate communications. Another example is the spoofing attack, where IP and TCP headers are manipulated to make it appear that one or more datagrams are coming from a trusted or authorized source, giving the sender unauthorized access.

Thus, there will often be an element in the transmission path, e.g., a firewall or intrusion-detection system (IDS), whose function is to detect and/or prevent such attacks. Typically, a firewall or IDS evaluates a received datagram against one or more rules. If a received datagram satisfies the one or more rules, it is passed (processed for re-transmission); otherwise, it is dropped (discarded). This selective passing and dropping of datagrams in accordance with rules is known as filtering.

Filtering typically involves zones, stateful inspection, and application-layer filtering. A zone is a range of allowable source IP addresses for a particular interface. There can be multiple zones defined for a single interface. If the source IP address of a datagram received on an interface does not fall within any of the zones defined for that interface, then the datagram is dropped. Thus, for example, if an interface has two zones, a first that allows all datagrams with a source IP address of 192.168.1.1 to 192.167.1.127, and a second that allows all datagrams with a source IP address beginning with 204, then datagram with a source IP address of 19.63.8.30 received on that interface will be dropped.

Stateful inspection examines not only datagrams in isolation, but also the ongoing state of communications between source and destination, and thus the relationship between the instant datagram and related datagrams, if any, that preceded it. For example, a firewall performing stateful inspection may drop inbound datagrams that are not responses to communications initiated from behind the firewall. Application-layer filtering, also known as deep packet inspection, goes beyond datagram headers and inspects application-layer data in order to make a pass/drop decision.

Just as with datagram routing, fragmentation complicates the task of datagram filtering. When an IP packet has been fragmented, the data required by a rule may be located in any one or more of the packet's fragments. Furthermore, some fragment sequences themselves pose threats against network elements, even when the contents of those individual fragments appear innocuous. Such sequences may be accidental or intentionally crafted by an attacker intent upon probing, damaging, or intruding into a targeted network. For example, certain sequences of overlapping fragments can be used to bypass some firewall filters and gain access to protected services. Similarly, out-of-offset-order fragment sequences can be designed to bypass firewalls or overwhelm them in a denial-of-service attack.

Routers, firewalls, and intrusion-detection systems adopt different strategies for filtering and routing fragments. Simpler strategies include passing all fragments, dropping all fragments, dropping all out-of-offset-order fragments, or tracking and dropping all overlapping and/or duplicate fragment sequences. Passing all fragments shifts the processing of fragments to a downstream device, such as a protected host, and defeats the purpose of a firewall, which is to block certain communications from reaching critical resources. Dropping all fragments is effective against fragmentation attacks, but also quashes many legitimate communications. Dropping all out-of-offset-order fragments is similarly overinclusive and does not protect against overlapping fragment attacks. Furthermore, none of these strategies provides for more-sophisticated filtering of fragments or for the modification of fragments.

A more-effective strategy for fragment filtering and routing is full reassembly. Here, a router buffers in memory all fragments for a particular packet, re-sequences any out-of-offset-order fragments into their offset order, and reassembles those fragments to yield an intact packet. The router then filters/routes the intact packet, re-fragments the packet if appropriate, and re-transmits the resulting datagram(s) towards the appropriate destination.

One disadvantage of full reassembly is that it is resource-intensive, requiring a router to buffer every fragment of a packet in memory for as long as it takes for all fragments of that packet to arrive. Furthermore, the acts of buffering, re-sequencing, and reassembling consume processing resources.

Another shortcoming of full reassembly is visibility. Since full reassembly re-transmits either a complete packet or a set of fragments in offset order, there is often a difference between the datagrams entering and exiting full reassembly. Someone monitoring such data streams can determine that there is a firewall in operation and can begin attacking that firewall.

An alternative to full reassembly is to route fragments based on the information contained in the offset-0 fragment (fragment-0 routing). Such a method is detailed in U.S. Pat. No. 6,795,866, the teachings of which are hereby incorporated by reference in their entirety. This method buffers in memory only those fragments (if any) that arrive before the offset-0 fragment. If and when the offset-0 fragment arrives, the method makes a routing decision based on the IP and TCP headers of the offset-0 fragment and re-transmits that fragment accordingly. The method then applies that routing decision to any buffered fragments and any subsequently received fragments. Thus, with the exception of the offset-0 fragment, which is typically routed first, fragments are routed by this method in the order in which they were received.

Fragment-0 routing possesses several advantages over full reassembly. Fragment-0 routing does not require buffering all fragments, but only those that arrive before the offset-0 fragment, thus often consuming fewer memory resources than full reassembly. Furthermore, fragment-0 routing is, on average, quicker than full reassembly because buffered fragments do not sit idle awaiting the arrival of the slowest fragment, but only until the offset-0 fragment arrives. Lastly, the steps of re-sequencing and reassembling a complete packet have been eliminated, reducing overhead and increasing efficiency.

Yet, fragment-0 routing also suffers from several drawbacks. First, the method does not provide the ability to make a routing decision based on information outside the offset-0 fragment, e.g., application-layer data. Second, the method does not provide for the detection or mitigation of a wide range of fragment-based attacks. In other words, fragment-0 routing does not perform filtering. Third, the method does not provide full control over the re-transmission of fragments. For example, a system administrator may want to re-transmit fragments as a fully reassembled packet, and not individually in the received order.

The first of these shortcomings (examining fragments other than the fragment-0 fragment) was considered in U.S. Pat. No. 7,065,086, the teachings of which are hereby incorporated by reference in their entirety. This method alludes to the examination of other fragments in addition to fragment 0, but provides no details on how such examination would take place. As with fragment-0 routing, this method does not perform filtering, nor does it provide full control over the re-transmission of fragments.

SUMMARY OF THE INVENTION

One embodiment of the present invention provides a system that improves the performance of a stateful packet-filtering firewall, reducing the frequency with which fragments must be fully or partially reassembled for firewall filtering while assuring that the firewall provides detection and mitigation of a wide range of fragmentation-based attacks and probes. The approach enables the firewall to impose strict TCP state enforcement and to selectively reassemble packets, either partially or fully, in order to perform application-layer filtering.

The system operates by collecting and reordering fragments until enough protocol header and payload information is present for the firewall to examine and determine what action is to be taken on the fragments.

One embodiment of the present invention also addresses the shortcoming of the prior art by providing a system administrator with full control over how fragments are re-transmitted. Under the direction of firewall filtering rules, for example, fragments may be fully reassembled and uniformly re-fragmented or may be incrementally re-transmitted in offset order or received order.

One embodiment of the present invention also provides a wide range of protection against potential fragment-based attacks. Fragments are examined as they are received to verify that they do not overlap one another and that the fragment sequence does not exploit common weaknesses in IP packet-reassembly algorithms. Valid fragment sequences that represent potential threats to the receiver are reordered and/or fully or partially re-assembled and re-fragmented into a fragment sequence that eliminates or reduces the threat to the receiver. Fragmented sequences that represent a likely attack are blocked, as are subsequent fragments of the associated packet.

In one embodiment of the present invention, a node in a communication system receives a group of one or more fragments in a received sequence where the group corresponds to a packet that was fragmented into a set of fragments having an offset order corresponding to increasing offset values. The set of fragments comprises an offset-0 fragment (i.e., the first fragment in the offset order of the set of fragments), and at least one additional fragment that is received before the offset-0 fragment. The node buffers the group of one or more fragments, analyzes a rule set to match a rule for the buffered group, and applies the matched rule to the buffered group to (i) determine whether the buffered group is to be re-transmitted and (ii) if the buffered group is to be re-transmitted, determine how to re-transmit the buffered group. The rule set comprises a first rule stipulating that received fragments corresponding to a single packet are re-transmitted in the received sequence independent of whether or not at least one additional fragment is received before the offset-0 fragment, such that, when the first rule is applied to the buffered group, the offset-0 fragment is not the first fragment of the buffered group to be re-transmitted.

In another embodiment of the present invention, a node in a communication system receives a group of one or more fragments in a received sequence where the group corresponds to a packet that was fragmented into a set of fragments having an offset order corresponding to increasing offset values, and the group is a subset of the set of fragments. The node buffers the group of one or more fragments, and re-transmits the buffered group. The node receives a further fragment which is not contiguous with the group, and buffers that further fragment. The node receives one or more other fragments that form, with the group and the buffered further fragment, a single contiguous subset of fragments, and re-transmits the one or more other fragments and the buffered further fragment.

In yet another embodiment of the present invention, a node in a communication system receives groups of fragments, wherein each group of fragments corresponds to a different packet that was fragmented into a set of fragments having an offset order corresponding to increasing fragment offset values. Each set of fragments comprises an offset-0 fragment and one or more additional fragments, and the offset-0 fragment is the first fragment in the offset order of the set of fragments. The node buffers the groups of fragments, analyzes a rule set to match a rule for each buffered group, and applies to each buffered group the corresponding matched rule to (i) determine whether the buffered group is to be re-transmitted and (ii) if the buffered group is to be re-transmitted, determine how to re-transmit the buffered group. The rule set comprises a first rule stipulating that received fragments corresponding to a single packet are to be reassembled prior to re-transmission and a second rule stipulating that received fragments corresponding to a single packet are not to be reassembled prior to re-transmission.

In yet another embodiment of the present invention, a node in a communication system receives a set of fragments in a received sequence, wherein the set of fragments corresponds to a packet that was fragmented into the set of fragments having an offset order corresponding to increasing fragment offset values. The set of fragments comprises an offset-0 fragment and one or more additional fragments, and the offset-0 fragment is the first fragment in the offset order of the set of fragments. The set of fragments is received out of the offset order, and at least one of the additional fragments is received after the offset-0 fragment. The node buffers the set of fragments and then re-transmits the set of fragments as fragments in the offset order such that none of the fragments are re-transmitted until after all of the fragments in the set have been received and buffered.

In yet another embodiment of the present invention, a node in a communication system receives a first fragment which corresponds to a packet that was fragmented into a set of fragments having an offset order corresponding to increasing fragment offset values. The set of fragments comprises an offset-0 fragment and one or more additional fragments, and the offset-0 fragment is the first fragment in the offset order of the set of fragments. The node (i) analyzes a rule set to match a rule for the first fragment, (ii) applies the matched rule to process the first fragment, (iii) receives a second fragment corresponding to the packet, and (iv) applies the matched rule to process the second fragment, wherein the processing of the second fragment is different from the processing of the first fragment.

In yet another embodiment of the present invention, a node in a communication system receives a first group of one or more fragments, wherein the first group corresponds to a first packet that was fragmented into a first set of fragments. The node analyzes a rule set to match a first rule for the first group, and applies the matched first rule to process the first group. The node receives a second group of one or more fragments, wherein the second group corresponds to a second packet that is different from the first packet and was fragmented into a second set of fragments. The node analyzes the rule set to match a second rule for the second group and applies the matched second rule to process the second group, wherein the first group is re-transmitted and the second group is not re-transmitted.

BRIEF DESCRIPTION OF THE DRAWINGS

Other aspects, features, and advantages of the invention will become more fully apparent from the following detailed description, the appended claims, and the accompanying drawings in which like reference numerals identify similar or identical elements.

FIGS. 6-8 are flowcharts that describe one embodiment of fragment-handling process 302 of FIG. 3.

FIG. 9 is a flowchart of one embodiment of timeout process 304 of FIG. 3.

DETAILED DESCRIPTION

Embodiments of the present invention may be implemented as systems, methods, and apparatuses for the efficient routing of packets and fragments, and for the detection, prevention, and mitigation of malicious or otherwise undesirable communications.

Figure 1:
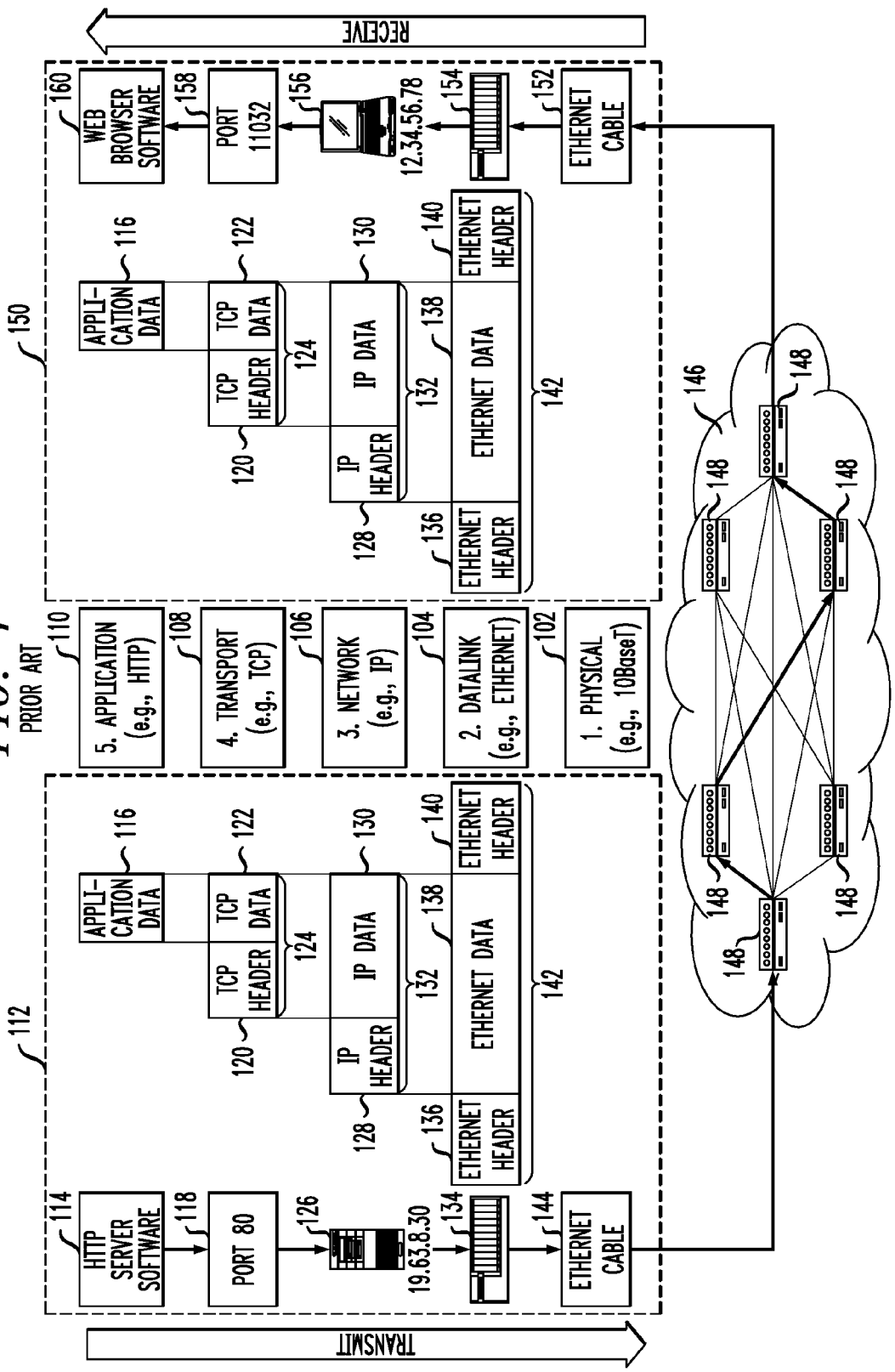
FIG. 1 is a graphical depiction of the five-layer protocol stack of the Internet, how the protocols in the stack format datagrams, how those protocol layers correspond to objects in the real world, and how datagrams are routed from source to destination via the Internet.
Figure 3:
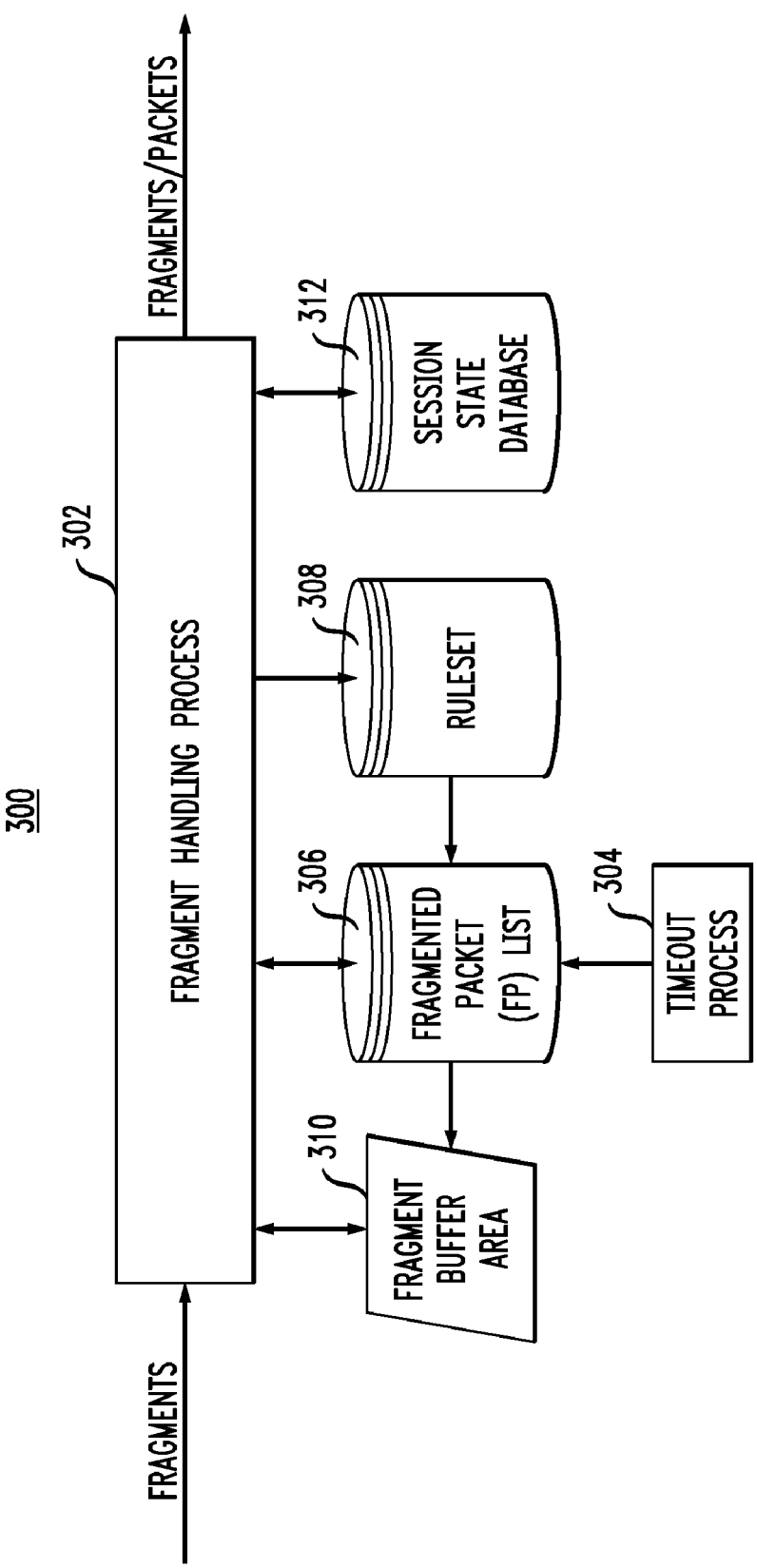
FIG. 3 is a block diagram of a fragment-handling system, according to one embodiment of the present invention.

FIG. 3 is a block diagram of fragment-handling system 300, according to one embodiment of the present invention. System 300 comprises fragment-handling process 302, fragmented packet list 306, ruleset 308, session state database 312, timeout process 304, and fragment buffer area 310. Fragment-handling system 300 would typically be implemented as a router, e.g., router 148 in FIG. 1.

Fragment-handling process 302 receives, buffers, routes, and filters fragments, and re-transmits fragments and/or packets. Processing upstream of system 300 (not shown in FIG. 3) determines whether a received datagram is a packet or a fragment by examining Fragment Offset field 210 and More Fragments field 212 in the datagram's IP header. Fragment-handling process 302 also communicates with other components of system 300, e.g., buffering received fragments in, and receiving buffered fragments from, fragment buffer area 310; writing data to and requesting data from fragmented packet list 306; and submitting fragments and partially reassembled or fully reassembled packets to ruleset 308 for rule matching.

Fragmented packet (FP) list 306 includes a data structure that receives and stores information from other components of system 300. Specifically, FP list 306 receives and stores (1) information from packet-handling process 302 regarding received fragments and the current state of processing; (2) policy information from ruleset 308 upon rule matching; (3) pointers to fragment buffers in fragment buffer area 310; and (4) results from the operations of timeout process 304.

Ruleset 308 includes a data structure comprising any number of rules. Each rule is matched to one or more datagram characteristics, and thus applies only to a defined set of datagrams. For example, there could be a rule for all fragments with a TCP destination port of 25, or for all fragments with an IP source address of 19.63.08.30. The process of selecting a matched rule for a datagram is known as rule matching.

A rule comprises any number of policies. Policies instruct fragment-handling process 302 how to process a fragment or set of fragments that match the corresponding rule. There are several types of policies, including filter and re-transmission policies. A filter policy evaluates the received fragment or fragments and makes a pass/drop decision. For example, a filter policy might drop any fragment that has a TCP destination port of 25. Filter policies might go beyond the IP and TCP headers of a fragment, and inspect the application-layer data, e.g., drop all fragments that request a particular URL.

For fragments that are to be passed, re-transmission policies determine how those fragments are to be processed before being re-transmitted. One re-transmission policy would be to re-transmit the received fragments for a particular packet, unmodified, in the exact order in which they were received. For example, let 0, 1, 2, 3, 4 represent five fragments of a packet in offset order. If the received order of the fragments was (1 0 2 4 3), then the fragments will be re-transmitted in the order (1 0 2 4 3). Such a re-transmission policy might be used by an intrusion-detection system running in stealth mode whose purpose is to inspect datagrams and alert other devices to potential problems without revealing its presence to the outside world.

Another re-transmission policy might be to buffer fragments for a particular packet until all fragments have been received, and then re-transmit those fragments as fragments in offset order. For example, a packet is fragmented into six fragments. If those six were received in the order (1 2 3 4 0 5), then the system would wait until all six fragments arrived and then re-transmit all those fragments as fragments in the order (0 1 2 3 4 5). This re-transmission policy might prove useful in preventing attacks that rely on out-of-sequence fragment sequences.

Yet another re-transmission policy might be to re-transmit received fragments as fragments in offset order from offset 0 as soon as possible, rather than first waiting for all fragments to arrive as in the previous re-transmission policy. For example, assume that the first seven fragments of a particular packet are received in the order (1 2 3 4 0 6 5). The system would buffer fragments 1, 2, 3, and 4. The arrival of fragment 0 would yield a contiguous set of fragments from offset 0, so the system would at that point re-transmit the received fragments in offset order (0 1 2 3 4). The system would then receive and buffer fragment 6 because fragment 6 would not be contiguous with the data from offset 0. However, upon receipt of fragment 5, the data would now be contiguous, and the system would re-transmit the two fragments in offset order (5 6).

Yet another re-transmission policy might be full reassembly, i.e., collect all fragments of a particular packet, re-sequence the received fragments in offset order (if necessary), fully reassemble those fragments into a single packet, and re-transmit that packet. A further variant on this re-transmission policy would be to re-fragment the reassembled packet before re-transmission, where, depending on the re-fragmentation processing, the re-fragmentation might produce a different set of fragments from those that were received.

The application of the policies of a matched rule, whether they be filter policies, re-transmission policies, or some other type of policy, is known as rule application.

Ruleset 308 receives fragments and partially reassembled or fully reassembled packets from fragment-handling process 302 for rule matching, and sends policy information to FP list 306 if and when a rule is matched.

Session state database 312 contains one or more session state records which indicate the states of active sessions. A session is typically defined as, at a minimum, the communication between two specific IP addresses using a specific transport protocol (e.g., TCP, UDP), where the time between datagrams does not exceed a specified timeout value. Often, other parameters are added to the definition of a session. For example, a TCP session typically consists of not only the parameters listed above, but also the source and destination TCP ports of the datagrams. Thus, a set of TCP datagrams exchanged between 19.63.8.30:80 and 12.34.56.78:11032 that do not violate timeout constraints would constitute a typical TCP session.

A session state record records the results of rule matching. That is, once a rule has been matched to a set of datagram characteristics (i.e., a session), that association is recorded in the session state database. The session state database significantly reduces the time required by fragment handling process 302 to ascertain what action to take on subsequent session datagrams.

Processes other than fragment handling process 302 might create session state records. If, for example, the first received datagram for a new session is an unfragmented packet, then the process which handles unfragmented packets, not fragment handling process 302, will create a session state record for that new session.

Timeout process 304 periodically examines FP list 306 and modifies any data older than a specified time interval.

Fragment buffer area 310 is memory space where received fragments are stored by fragment-handling process 302 during processing.

Figure 4:
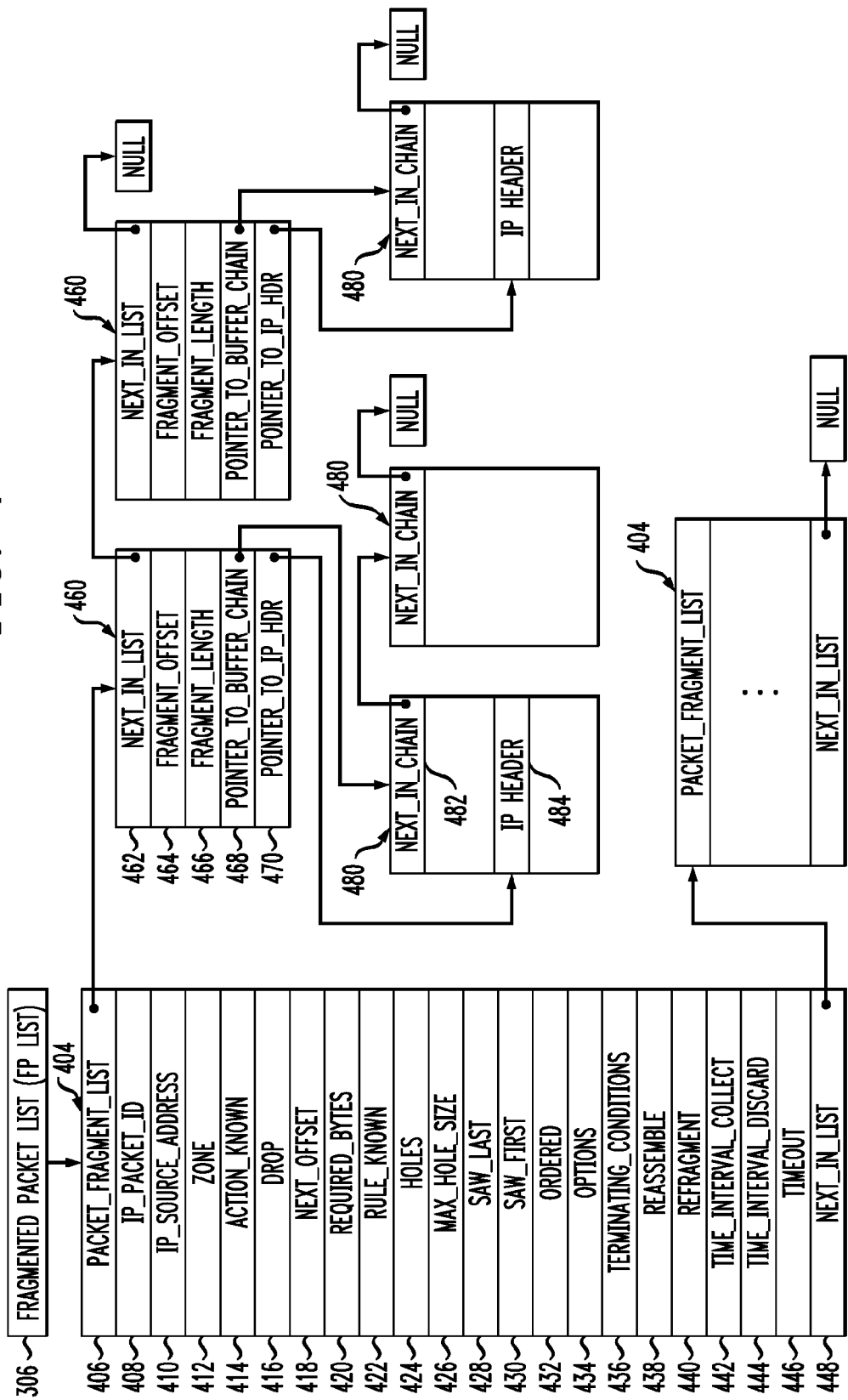
FIG. 4 is a diagram of one embodiment of fragmented packet list 306 of FIG. 3.

FIG. 4 is a diagram of one embodiment of fragmented packet list 306 of FIG. 3. FP list 306 comprises any number of Packet Entries (PEs) 404, each of which is associated with a different packet. Each PE 404 is associated with one or more fragment entries (FE) 460, one for each fragment that has been received for the associated packet. Each FE 460 is associated with one or more buffers 480, which store the actual fragment data. FP list 306 is depicted as a singly linked list, but it could also be implemented in a number of different ways, e.g., a doubly linked list.

Each PE 404 comprises a number of fields. PACKET_FRAGMENT_LIST field 406 is a pointer to the first of any number of fragment entries (FEs) 460 for this PE.

IP_PACKET_ID field 408 contains the value of the Identification field (e.g., field 236 of FIG. 2) of the IP header of the received fragment. IP_SOURCE_ADDRESS field 410 contains the value of the Source IP Address field (e.g., field 232 of FIG. 2) of the IP header of the received fragment. ZONE field 412 indicates the firewall zone that matches the source IP address and the network interface upon which the fragments of the packet were received. These three fields constitute a key that uniquely identifies every PE in the FP list.

ACTION_KNOWN field 414 and DROP field 416 are both true/false fields. Together, these two fields indicate the PE action. The PE action can be one of three functions: pass, drop, or unknown. Specifically, if ACTION_KNOWN is false, then the PE action is unknown, regardless of the value of DROP. If ACTION_KNOWN is true and DROP is true, then the PE action is drop. If ACTION_KNOWN is true and DROP is false, then the PE action is pass. When a PE is initialized, ACTION_KNOWN and DROP are both set to false. The values in these fields may be changed by fragment-handling process 302 or timeout process 304.

If the PE action is unknown, then fragment-handling process 302 requires more fragments of the same packet before making a pass/drop decision. Thus, the process buffers the received fragment and awaits further fragments from the same packet. If the PE action is drop, then the received fragment is discarded, and the process takes no further action regarding that fragment. If the PE action is pass, then the received fragment is processed and re-transmitted according to the re-transmission policies associated with the PE.

NEXT_OFFSET field 418 indicates the number of contiguous bytes from offset 0 that have been received for this PE. Typically, the value of NEXT_OFFSET is updated every time a new contiguous fragment is received. Typically, NEXT_OFFSET field 418 is not changed upon receipt of a fragment that is not, at the time of receipt, contiguous with any data which is contiguous from offset 0.

REQUIRED_BYTES field 420 indicates the number of bytes required to apply a matched rule. REQUIRED_BYTES is initialized to 0 and is typically updated once a rule has been matched, and, in some circumstances, may be repeatedly updated thereafter.

RULE_KNOWN field 422 is a true/false field indicating whether a rule has been matched or not. RULE_KNOWN is initialized to false, and set to true if and when a rule has been matched.

HOLES field 424 indicates how many gaps or "holes" there are in a set of received fragments. A hole is created when a fragment has been received, but the immediately preceding offset-order fragment has not been received. For example, referring to FIG. 2, if the second fragment (266) of packet 132 has been received, but not the first fragment (246), then HOLES would equal one. Similarly, if the first fragment (246) and third fragment (286) of packet 132 have been received, but not the second fragment (266), then HOLES again equals one. HOLES is initialized to 0 and updated, if appropriate, every time a valid fragment is added to a PE.

MAX_HOLE_SIZE field 426 indicates, in bytes, the maximum hole size that will be allowed for this PE. If a hole is created that exceeds this value, then the PE action is changed to drop. For example, referring to FIG. 2, if the first (246) and third (286) fragments of packet 132 were received, but not the second fragment (266), then a 128-byte hole would be created. If MAX_HOLE_SIZE was 64 bytes, then the creation of this 128-byte hole would result in the PE action being changed to drop. MAX_HOLE_SIZE is set to a zone default when the PE is initialized, or to a system default if there is no zone default. MAX_HOLE_SIZE might be updated once a rule has been matched.

Figure 2:
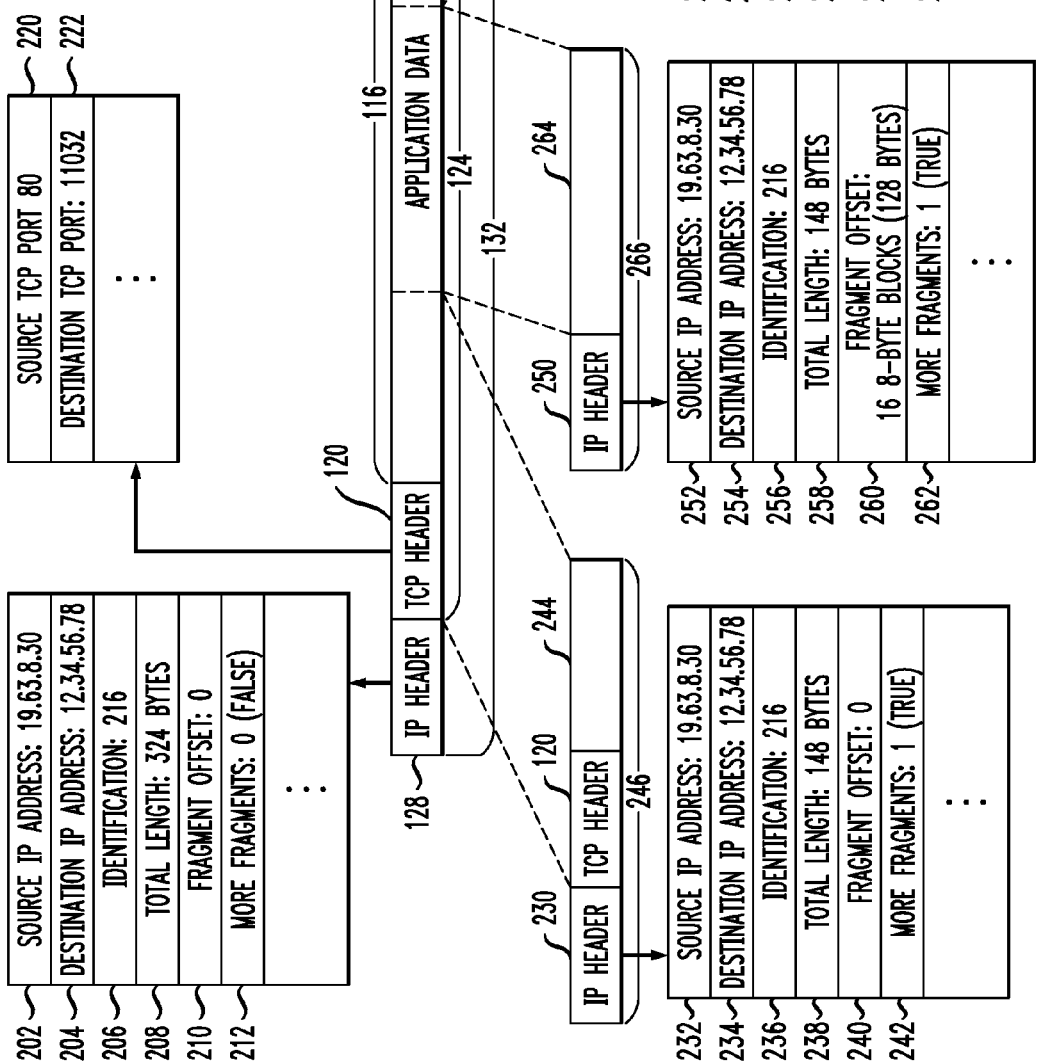
FIG. 2 is an exploded view of datagram 132 of FIG. 1 and illustrates the results of IP packet fragmentation.

SAW_LAST field 428 is a true/false field indicating whether the last offset fragment (i.e., the fragment with MF flag set to 0, e.g., field 282 of FIG. 2) has been received. This field is typically used to speed up determination of whether all fragments for this packet have been received. It is initialized to false and updated to true if and when the last offset fragment is received.

SAW_FIRST field 430 is a true/false field that indicates whether the offset-0 fragment (i.e., the fragment with a Fragment Offset field set to 0, e.g., fragment 246 of FIG. 2) has been received. This field is typically used to speed up rule-matching because the offset-0 fragment is typically required for rule matching.

ORDERED field 432 is a true/false field that indicates whether the fragments received to date for this PE have been received in offset order. If any fragments are received out-of-offset-order, then this field will be set to false and remain false. If the matched rule for this PE requires that fragments be received in strict offset order, then this field will speed determination of whether that condition has been met.

OPTIONS field 434 is a collection of one or more flags that indicate various policies of the rule matched by the received fragments, if any. For example, a flag in OPTIONS field 434 might indicate whether fragments must be received in offset order. If that flag is set to true, then receipt of an out-of-offset-order fragment will change the PE action to drop. OPTIONS field 434 is initialized to either global or zone defaults when the PE is created, and might be updated when a matched rule is applied.

TERMINATING_CONDITIONS field 436, like OPTIONS field 434, is a collection of one or more flags that indicate various policies of the rule matched by the received fragments, if any. For example, a flag in TERMINATING_CONDITIONS, in combination with a threshold value could set a maximum number of fragments that will be accepted for a particular packet or set of packets. If that number is exceeded, then the PE action will be changed to drop.

REASSEMBLE field 438 is a true/false field indicating whether all the fragments of this packet must be fully reassembled before being re-transmitted. REFRAGMENT field 440 is a true/false field indicating whether the fully reassembled packet of this PE must be re-fragmented during re-transmission.

TIME_INTERVAL_COLLECT field 442 indicates the number of milliseconds the PE action may remain unknown or pass, i.e., the collection interval. When a new PE is created, the value in TIME_INTERVAL_COLLECT is added to the current system time, and the sum written to TIMEOUT field 446.

TIME_INTERVAL_DISCARD field 444 indicates the number of milliseconds the PE action may remain drop, i.e., the drop interval. When the PE action is set to drop (i.e., ACTION_KNOWN field 414 and DROP field 416 are both set to true), either by expiration of the collection interval or by application of a matched rule, the value in TIME_INTERVAL_DISCARD is added to the current system time, and the sum written to TIMEOUT field 446.

TIMEOUT field 446 indicates the time at which the current PE action will expire. When a new PE is created, TIMEOUT is initialized to a value equal to the current system time plus the number of milliseconds specified by either TIME_INTERVAL_COLLECT field 442 or TIME_INTERVAL_DISCARD field 444, depending upon the state of DROP field 416. Further explanation of timeout process 304 and TIMEOUT field 446 is provided below with respect to FIG. 9.

NEXT_IN_LIST field 448 is a pointer to a next PE in the FP list or to NULL if there are no further PEs.

Each Fragment Entry (FE) 460 comprises a number of fields. NEXT_IN_LIST field 462 is a pointer to the next FE or to NULL if there are no further FEs for this PE. FRAGMENT_OFFSET field 464 and FRAGMENT_LENGTH field 466 are taken from IP header fields Fragment Offset (e.g., field 240 of FIG. 2) and Total Length (e.g., field 238 of FIG. 2), respectively.

When a fragment is received, it may be stored in a single buffer 480 or a chain of buffers 480 in memory. POINTER_TO_BUFFER_CHAIN field 468 is a pointer to the first buffer 480 associated with this FE. POINTER_TO_IP_HDR field 470 points to the location 484 of the IP header (if any) in the buffer chain. A buffer's NEXT_IN_CHAIN field 482 points to the next buffer in the chain or to NULL if there are no more buffers in this chain.

Figure 5:
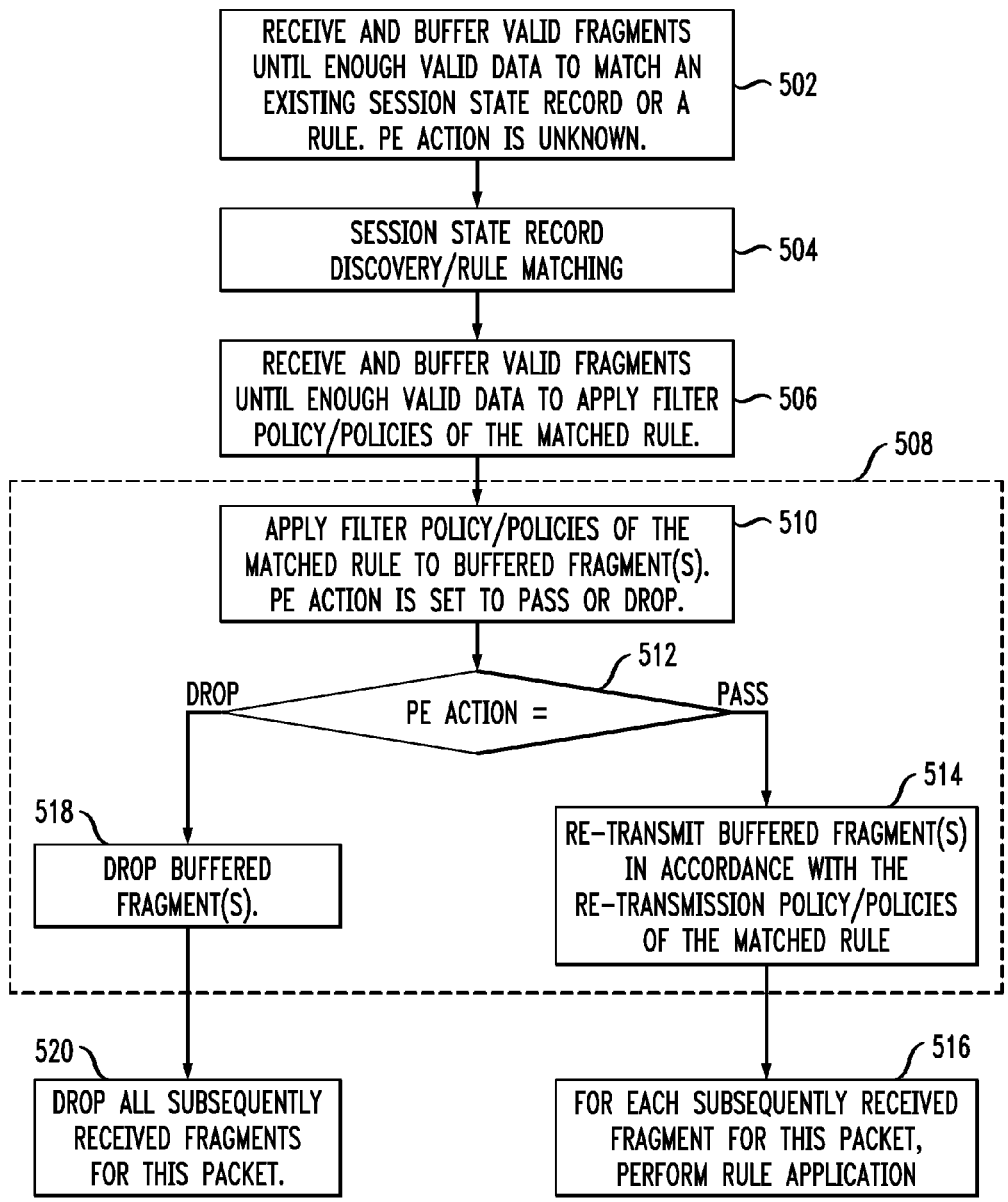
FIG. 5 is a summary flowchart describing a typical life-cycle of a typical fragmented packet processed by the fragment-handling system of FIG. 3.

FIG. 5 is a summary flowchart describing a typical lifecycle of a typical fragmented packet processed by fragment-handling system 300 of FIG. 3. Thus, FIG. 5 represents multiple iterations of fragment-handling process 302, one for each received fragment of a single packet. First, fragment-handling system 300 buffers enough valid received fragments to match an existing session or a rule (step 502). Next, session state database 312 is searched for a match to the packet. If a match is found, then the associated rule is identified. Otherwise, ruleset 308 is searched and a rule is matched (step 504). Session record discovery or rule lookup is performed only once for a particular packet. Then, the system buffers additional fragments required (if any) for applying the filter policies of the matched rule (step 510).

Rule application 508 begins with applying the filter policies of the matched rule, the typical result of which is to change the PE action from unknown to either pass or drop (step 510). If, at step 512, the PE action is drop, then the buffered fragment(s) are dropped (discarded) (step 518), and all subsequently received valid fragments are likewise dropped (step 520). Thus, once a PE action is changed to drop, it will remain drop until the PE is deleted by timeout process 304.

If, instead, at step 512, the PE action is pass, then the buffered fragments are re-transmitted in accordance with the re-transmission policy/policies of the matched rule (step 514). The re-transmission policy/policies might delay re-transmission of all the buffered fragments until subsequent fragments arrive, delay some buffered fragments and re-transmit others, or re-transmit all the buffered fragments at this time. Unlike subsequently received valid fragments for a packet with a PE action of drop, each subsequently received valid fragment for a packet with a PE action of pass will go through rule application 508 (step 516). Thus, a PE action of pass might change to drop for a subsequently received fragment.

Note that FIG. 5 is for a typical fragment. The lifecycle for any particular fragment may be different from FIG. 5. For example, overlapping or duplicate received fragments may change PE action to drop at step 502, thus jumping straight from that step to step 518. Similarly, fragment-handling system 300 may never receive enough data to match a rule or to apply the filter policies of a matched rule. These variations are described in FIGS. 6-8.

Likewise, FIG. 5 is a summary flowchart, and details have been omitted. For example, the specific steps of creating and updating the PE for the received fragments, other than the updating of the PE action, have been omitted to aid understanding. These details are described in FIGS. 6-8.

FIGS. 6-8 are flowcharts that describe one embodiment of fragment-handling process 302 of FIG. 3. Fragment-handling process 302 handles only fragments, and does not handle complete packets. Processing starts at step 602 of FIG. 6 with the receipt of a fragment. At step 604, the received fragment is subjected to any number of tests to determine if it is a valid IP fragment. For example, one test might be whether Total Length (e.g., field 238 of FIG. 2) falls within the limits of the IP protocol. Another test might be to determine whether the source IP address (e.g., field 232 of FIG. 2) of the received fragment matches any zone for the network interface upon which the received fragment was received. If the received fragment fails any one of the tests of step 604, then the received fragment is dropped (step 606). Processing of this received fragment is concluded, and fragment-handling process 302 returns to step 602 to await receipt of another fragment.

If the received fragment successfully passes step 604, then the next step is to determine whether the received fragment is the first received fragment for a new packet. In step 608, fragment-handling process 302 searches FP list 306 for a matching packet entry (PE) (e.g. 404 of FIG. 4) using a key generated from the received fragment's source IP address field (e.g., field 232 of FIG. 2), the received fragment's packet Identification field (e.g., field 236 of FIG. 2), and the ID of the zone matched in step 604.

If a matching PE is not found, then the received fragment is the first fragment received for a new packet. Consequently, at step 610, a new PE is created in FP list 306, and the fields of that PE are initialized. Typically, PE fields will be initialized with default values associated with the matched zone. If the matched zone does not specify a default for a field, then a system-default value typically will be used. Also, at step 610, a Fragment Entry (FE) 460 for the received fragment is created and associated with the newly-created PE. Once the new PE and FE have been created and initialized, processing proceeds to EXISTS node 612.

If, instead, a matching PE for this fragment is found in FP list 306 at step 608, then, at step 614, the PE action is examined. The PE action is defined by two PE fields: ACTION_KNOWN field 414 and DROP field 416. The PE action can be one of three functions: pass, drop, or unknown. If, at step 614, the PE action is drop, then processing proceeds to step 606. Processing of this received fragment is concluded, and fragment-handling process 302 returns to step 602 to await receipt of another fragment.

If, at step 614, the PE action is not drop, then, at step 616, the received fragment is compared to other received fragments, if any, associated with the same PE to determine if the received fragment fails one or more inter-fragment tests. For example, a received fragment fails if it is a duplicate of a previously received fragment, overlaps a previously received fragment, or has a combined Total Length (e.g., field 238 of FIG. 2) and Fragment Offset (e.g., field 240 of FIG. 2) value that would cause the assembled IP datagram to exceed 65,535 bytes in total length.

If the received fragment fails at step 616, then step 618 determines whether the policy requires that the PE action be changed to drop. If so, then the PE action is changed to drop in step 620 and processing proceeds to BLOCK node 622. Otherwise, processing proceeds to step 606. For example, the policy for one PE might be that duplicate fragments have no effect on PE action, i.e., the offending fragment is to be discarded in step 606, but the previously received packets and PE action remain unchanged and thus the fragment-handling process will accept more fragments for this same packet. For another packet, the policy may be that a single duplicate fragment requires that this fragment and all previously received and any subsequently received fragments be dropped. In this case, the PE action is changed to drop in step 620.

If the received fragment satisfies the tests of step 616, then, at step 624, the filter policies of the rule associated with this PE are applied to the received fragment and any buffered fragments, and the PE action set accordingly. If no rule from ruleset 308 has yet been matched, then the default rule of the matched zone will be used. If there is no rule for the matched zone, then a system-default rule will be used. Filter-policy application may require partial reassembly or full reassembly of the received fragments for the purpose of application-layer filtering. If the received fragments fail filter-policy application, then the PE action is set to drop, i.e., ACTION_KNOWN field 414 is set to true and DROP field 416 is set to true.

At step 626, the PE action is again examined. If the PE action is drop, then processing continues to BLOCK node 622. Otherwise, at step 628, a new fragment entry (FE) (i.e., 460 in FIG. 4) is created for the received fragment and linked to the PE associated with this fragment.

At step 630, the PE action is examined yet again. If the PE action is pass, then the received fragment has satisfied filter-policy application and is ready to be re-transmitted in accordance with the re-transmission policies of the matched rule. As such, control passes to ALLOW node 632. Otherwise, the action for the received fragment remains unknown, and processing continues to EXISTS node 612.

FIG. 7 is a continuation of FIG. 6. Control passes to FIG. 7 when a received fragment has passed all the tests in FIG. 6, but the PE action associated with that fragment remains unknown (i.e., ACTION_KNOWN field 414 of FIG. 4 is false), because either (1) a rule has not yet been matched or (2) a rule has been matched but not enough contiguous packet data from offset 0 has been received for filter-policy application. FIG. 7 describes the processing associated with rule matching and filter-policy application.

Processing begins at EXISTS node 612. At step 702, it is determined whether a rule has already been matched for the PE associated with the received fragment, i.e., whether RULE_KNOWN field 422 of FIG. 4 is true or false. If that field is true, then a rule has already been matched, and processing continues to step 704. If that field is false, then a rule has not been matched, and processing continues to step 706.

At step 706, it is determined whether there is sufficient data to match a rule. For example, one embodiment of the present invention might require the entire IP header (e.g., field 128 of FIG. 2), the Source TCP Port (field 220 of FIG. 2), and the Destination TCP Port (field 222 of FIG. 2) to match a rule. Typically, such data is found in the offset-0 fragment, but there is no guarantee that the offset-0 fragment will be received first, or at all. Additionally, a portion of a TCP header (e.g., header 120 of FIG. 2) may be found in fragments other than the offset-0 fragment. If the data required for rule matching has not yet been received, then processing continues to WAIT node 708. If, instead, there is sufficient received data to match a rule, then processing continues to step 710.

At step 710, fragment-handling process 302 attempts to match an existing session, or failing that, to match a rule. Specifically, the session state database is searched for a state entry using whatever data is required to match a state record or rule. If a state record is not found, then ruleset 308 of FIG. 3 is searched using whatever data is required to match a rule. If neither a state record nor a rule is matched, then, at step 712, the PE action is changed to drop and processing continues to BLOCK node 714.

If, instead, at step 710, a rule is successfully matched, then, at step 716, several changes are made to the PE. First, RULE_KNOWN field 422 of FIG. 4 is set to true, indicating that a rule has been matched. Second, other fields in the PE might be updated with values representing the policies of the matched rule, e.g., MAX_HOLE_SIZE field 426, OPTIONS field 434, TERMINATING_CONDITIONS field 436, REASSEMBLE field 438, REFRAGMENT field 440, TIME_INTERVAL_COLLECT field 442, and TIME_INTERVAL_DISCARD field 444. Lastly, REQUIRED_BYTES field 420 is updated with a value indicating how many contiguous bytes from offset 0 are required by the matched rule for application of the rule policies. Processing then continues to step 704.

Just as rule matching might require any number of contiguous bytes from offset 0, application of the filter policies of the matched rule might require any number of contiguous bytes from offset 0. Furthermore, those two numbers may be different.

Thus, at step 704, it is determined whether enough contiguous bytes from offset 0 have been received to apply the filter policies of the matched rule. Specifically, REQUIRED_BYTES field 420, which indicates how many contiguous bytes of packet data from offset 0 are required for filter-policy application, is compared to NEXT_OFFSET field 418, which indicates how many contiguous bytes of packet data from offset 0 have been received. If REQUIRED_BYTES is greater than NEXT_OFFSET, then there is not sufficient data for filter-policy application, and the process continues to WAIT node 708 to await the arrival of more fragments. If, instead, NEXT_OFFSET is greater than or equal to REQUIRED_BYTES, then there is sufficient fragment data for filter-policy application, and processing proceeds to step 718.

At step 718, it is determined whether the one or more received fragments satisfy all the filter policies of the matched rule. This step may require that the received fragments be partially or fully reassembled for the purpose of application-layer filtering. If, at step 718, the filter policies of the matched rule are satisfied, then the PE action is set to pass, i.e., ACTION_KNOWN field 414 is set to true, and DROP field 416 is set to false, and step 720 determines that processing continues to ALLOW node 722. If, instead, the received fragment data fails any one of the security policies, then PE action is set to drop, i.e., ACTION_KNOWN field 414 is set to true, and DROP field 416 is set to true, and step 720 determines that processing continues to BLOCK node 714.

A third alternative at step 718 is that there is insufficient received fragment data to apply the filter policies of the matched rule even though NEXT_OFFSET 418 is greater than or equal to REQUIRED_BYTES 420. A typical example is application-layer filtering, i.e., the inspection of specific data that might be located anywhere within the application data (e.g., payload 116 of FIG. 2), such as a web cookie. In that case, the process applies the filter policies of the matched rule to each received contiguous fragment. If the required application-layer data is found, then the policy/policies is/are evaluated, and the PE action set accordingly. If, instead, the received contiguous data does not contain the required application-layer data, then step 718 sets the PE action to unknown, and step 720 directs processing to step 724, where REQUIRED_BYTES 420 is updated with a value of NEXT_OFFSET+1. This new value for REQUIRED_BYTES 420 will cause fragment-handling process 302 to apply the filter policies of the matched rule again if and when a next contiguous fragment arrives.

FIG. 8 is a continuation of FIGS. 6 and 7. Processing arrives at BLOCK node 622 when the received fragment(s) fail(s) one or more system, zone, or rule filter policies and the PE action is set to drop, either at step 624 of FIG. 6 or step 718 of FIG. 7. At step 802, fragment entries and their respective fragment buffers are released and those resources freed, but the PE is retained. Next, at step 804, the PE's timeout is set to the drop interval, i.e., TIMEOUT field 446 is set to a value equal to the system time plus the number of milliseconds stored in TIME_INTERVAL_DISCARD 444. From now until the time specified in the TIMEOUT field, fragment-handling process 302 will drop any fragments subsequently received for this PE. Processing of this received fragment is concluded, and fragment-handling process 302 returns to step 602 of FIG. 6 via node 806 to await receipt of another fragment.

Processing arrives at WAIT node 708 from FIG. 7 when (1) a rule has not been matched or (2) a rule has been matched, but there is insufficient contiguous packet data from offset 0 to apply the filter policies of the matched rule. At step 808, the received fragment's fragment buffer or buffer chains 480 are linked to the corresponding fragment entry 460, and NEXT_OFFSET field 418 is updated with the length in bytes of contiguous data from offset 0. Processing of this received fragment is concluded, and fragment-handling process 302 returns to step 602 via node 806 to await receipt of another fragment.

Processing arrives at ALLOW node 722 when the PE action is pass, either at step 630 of FIG. 6 or step 720 of FIG. 7. It is along this pathway that fragments will be modified and re-transmitted by the fragment-handling process according to the re-transmission policies of the matched rule. In one embodiment of the present invention, there are three such re-transmission policies. The first re-transmission policy is to re-transmit fragments as fragments in the order received. The second re-transmission policy is to re-transmit fragments that are contiguous from offset 0 in offset order. The third re-transmission policy is to collect all fragments, re-sequence those fragments, reassemble those fragments into a complete packet, and then either re-transmit the packet intact or re-fragment the packet and then re-transmit. The third re-transmission policy requires that all fragments be received before re-transmitting any of the fragments, while the first and second do not.

At step 810, it is determined whether all fragments for a particular packet have been received. If so, then there is no need to await any further fragments, regardless of the re-transmission policy of the matched rule. Thus, at step 812, the received fragment and any buffered fragments are processed in accordance with the re-transmission policy of the matched rule. As fragments are processed, their fragment entries (460) and buffer chains (480) are released. When all fragments have been processed and re-transmission is complete, at step 814 the PE action is set to drop, i.e., DROP field 416 is set to true, TIMEOUT 446 is set to TIME_INTERVAL_DISCARD 444, and processing proceeds to step 804.

It is also at step 812 that fragments are modified, if necessary. If the source and/or destination addresses of the packet header have been modified (as is often the case with Network Address Translation, for example), then all the headers of all of the fragments of the packets may need to be modified, and the header checksums may need to be updated before each fragment of the packet is re-transmitted. If it has been necessary to partially reassemble the initial fragments of the packet for application of the filter policies of the matched rule, then, upon return, there will be an indication that the partially reassembled packet has been modified. If this occurs, and the packet size has not changed, then the packet fragments typically will be modified in place to reflect these changes. If it has been necessary to change the size of the packet, then the packet typically will be fully reassembled and re-fragmented before re-transmission.

If, instead, at step 810, all fragments have not been received, then the next question is whether the re-transmission policy requires collecting all fragments before re-transmission (step 816). If collection of all fragments is required, then control thus passes to the WAIT pathway (step 708).

If the re-transmission policy at step 816 does not require collection of all fragments, then the re-transmission policy is either to re-transmit received fragments in offset order or to re-transmit received fragments in the received order. Thus, the next question is whether all preceding offset-order fragments have been received (step 818). If the answer is yes, then both remaining re-transmission policies are satisfied, and processing continues to step 822 where the received fragments are re-transmitted. If the answer at step 818 is no, then the next question, at step 820, is whether the re-transmission policy requires offset order. If the re-transmission policy is to re-transmit fragments in the received order, then the answer at step 820 is no, and processing continues to 822 where the received fragment is re-transmitted. If, instead, the re-transmission policy is to re-transmit in offset order, then the answer at step 820 is yes, and processing continues to WAIT pathway 708.

At step 822, the received fragments are re-transmitted, the fragment buffers (e.g., buffers 480) are released, but the fragment entries (e.g., 460) are retained so the fragment-handling process can detect duplicates and overlaps. After step 822, processing of this received fragment is concluded, and fragment-handling process 302 returns to step 602 to await receipt of another fragment.

Another element of the embodiment of the present invention is timeout process 304 of FIG. 3, a process separate from fragment-handling process 302 that periodically (e.g., once a second) checks the PE action and timeout values of each and every PE in FP list 306, and makes changes to those values as required.

The timeout process is a resource management process. PEs, FEs, and buffers all consume memory space and processor clock cycles. For many packets, most of those resources are released when the final fragment is received and the PE action is changed from pass to drop (e.g., steps 812 and 814 in FIG. 8).

However, the nature of a packet-switched network is that any fragment or fragments might never arrive. In such a situation, the PE action typically will never change from pass to drop, and resources will never be released. Over a long enough time, all of the system resources will be permanently dedicated to incomplete fragment sequences, thus prohibiting the processing of new communications. In fact, a common fragment-based attack is to intentionally flood a router with incomplete fragment sequences so as to consume all of the router's resources.

Furthermore, even when the final fragment is received, and the buffers and FEs are released, the PE still remains with a PE action of drop to block duplicate fragments or mitigate fragment attacks. At some point, that PE itself ought to be deleted so that its memory space can be recycled.

Thus, a system administrator can specify (1) how long a PE action can be unknown or pass (the collection interval) and (2) how long a PE action can be drop (the drop interval). Additionally, a system administrator has a process that periodically checks all PEs in the FP list and changes those PEs whose drop or collection interval has expired.

FIG. 9 is a flowchart of one embodiment of timeout process 304 of FIG. 3. Processing begins with START node 902 and continues to step 904 where a record pointer is pointed at the first PE in the FP list (e.g., FP list 306 of FIG. 3). If the FP list is empty, then, at step 906, the record pointer will point to the end of the FP list, and the timeout process will wait for a pre-determined amount of time (step 908) before returning to START node 902. If, instead, at step 906, the record pointer points to a PE, then processing continues to step 910 where that PE's timeout (i.e., TIMEOUT field 446) is compared to the current system time.

If, at step 910, the PE's timeout is less than or equal to the system time, then the timeout has not yet expired, and no changes need to be made to this PE. In that case, the pointer is set to the next PE in the FP list (step 912) and processing loops back to step 906.

If, instead, the timeout is greater than the current system time, then the timeout has expired, and the PE action ought to be changed. Processing continues to step 914. If step 914 determines that the current PE action is unknown or pass, then the collection interval has expired, and the PE action should be changed to drop (step 916). Specifically, DROP field 416 is set to true, all fragment entries (e.g., FEs 460) and all fragment buffers (e.g., buffers 480) for this PE are deleted, and the timeout is set to a value equal to the drop interval (i.e., TIME_INTERVAL_DISCARD 444) plus the current system time. The record pointer is then set to the next PE in the FP list at step 912, and processing loops back to step 906.

If, instead, the PE action at step 914 is drop, then the drop interval has expired, and this PE is deleted from the FP list (step 918). The record pointer is then set to the next PE in the FP list at step 912, and processing then loops back to step 906.

If, at step 906, there are no more PEs in the FP list, then the timeout process waits for a predetermined time at step 908 before starting again at step 904 with the first PE in the FP list.

While the present invention has been described in the context of the Internet and the five-layer protocol model traditionally used to describe the Internet, the present invention is not so limited. The present invention applies to any suitable packet-switched network and to any suitable protocol schema, such as the seven-layer OSI model.

The present invention may be implemented as (analog, digital, or a hybrid of both analog and digital) circuit-based processes, including possible implementation as a single integrated circuit (such as an ASIC or an FPGA), a multi-chip module, a single card, or a multi-card circuit pack. As would be apparent to one skilled in the art, various functions of circuit elements may also be implemented as processing blocks in a software program. Such software may be employed in, for example, a digital signal processor, microcontroller, or general-purpose computer.

The present invention can be embodied in the form of methods and apparatuses for practicing those methods. The present invention can also be embodied in the form of program code embodied in tangible media, such as magnetic recording media, optical recording media, solid state memory, floppy diskettes, CD-ROMs, hard drives, or any other machine-readable storage medium, wherein, when the program code is loaded into and executed by a machine, such as a computer, the machine becomes an apparatus for practicing the invention. The present invention can also be embodied in the form of program code, for example, whether stored in a storage medium, loaded into and/or executed by a machine, or transmitted over some transmission medium or carrier, such as over electrical wiring or cabling, through fiber optics, or via electromagnetic radiation, wherein, when the program code is loaded into and executed by a machine, such as a computer, the machine becomes an apparatus for practicing the invention. When implemented on a general-purpose processor, the program code segments combine with the processor to provide a unique device that operates analogously to specific logic circuits.

The present invention can also be embodied in the form of a bitstream or other sequence of signal values electrically or optically transmitted through a medium, stored magnetic-field variations in a magnetic recording medium, etc., generated using a method and/or an apparatus of the present invention.

Unless explicitly stated otherwise, each numerical value and range should be interpreted as being approximate as if the word "about" or "approximately" preceded the value of the value or range.

It will be further understood that various changes in the details, materials, and arrangements of the parts which have been described and illustrated in order to explain the nature of this invention may be made by those skilled in the art without departing from the scope of the invention as expressed in the following claims.

The use of figure numbers and/or figure reference labels in the claims is intended to identify one or more possible embodiments of the claimed subject matter in order to facilitate the interpretation of the claims. Such use is not to be construed as necessarily limiting the scope of those claims to the embodiments shown in the corresponding figures.

It should be understood that the steps of the exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments of the present invention.

Although the elements in the following method claims, if any, are recited in a particular sequence with corresponding labeling, unless the claim recitations otherwise imply a particular sequence for implementing some or all of those elements, those elements are not necessarily intended to be limited to being implemented in that particular sequence.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments necessarily mutually exclusive of other embodiments. The same applies to the term "implementation."

I claim:

1. A method for processing fragments received at a node in a communication system, the method comprising:
   (a) receiving a group of one or more fragments in a received sequence, wherein:
      (i) the group of one or more fragments corresponds to a packet that was fragmented into a set of fragments having an offset order corresponding to increasing fragment offset values;
      (ii) the set of fragments comprises an offset-0 fragment and one or more additional fragments;
      (iii) the offset-0 fragment is the first fragment in the offset order of the set of fragments; and
      (iv) the group comprises at least one additional fragment that is received before the offset-0 fragment;
   (b) buffering the group of one or more fragments;
   (c) analyzing a rule set to match a rule for the buffered group; and
   (d) applying the matched rule to the buffered group to (i) determine whether the buffered group is to be re-transmitted and (ii) if the buffered group is to be re-transmitted, determine how to re-transmit the buffered group, wherein the rule set comprises:
      (A) a first rule stipulating that received fragments corresponding to a single packet are re-transmitted in the received sequence in which the received fragments were received independent of whether at least one additional fragment is received before the offset-0 fragment, such that, when the first rule is applied to the buffered group, the offset-0 fragment is not the first fragment of the buffered group to be re-transmitted; and (B) a second rule stipulating that received fragments corresponding to a single packet are re-transmitted in sequence by the offset order of the set of fragments, such that, when the second rule is applied to the buffered group, the offset-0 fragment is the first fragment of the buffered group to be re-transmitted.

2. The method of claim 1, wherein the set of fragments comprises one or more fragments that are not part of the group of one or more fragments.

3. A method for processing fragments received at a node in a communication system, the method comprising:
  (a) receiving a group of one or more fragments, wherein:
    the group of one or more fragments corresponds to a packet that was fragmented into a set of fragments having an offset order corresponding to increasing fragment offset values; and
    the group of one or more fragments corresponds to a subset of the set of fragments;
  (b) buffering the group of one or more fragments;
  (c) re-transmitting the buffered group;
  (d) receiving a further fragment of the set that is not contiguous with the group;
  (e) buffering the further fragment;
  (f) receiving, after steps (a)-(e), one or more other fragments that form, with the group of one or more fragments and the buffered further fragment, a single contiguous subset of fragments; and
  (g) re-transmitting, after steps (a)-(f), the one or more other fragments and the buffered further fragment.

4. The method of claim 3, wherein step (c) occurs prior to step (d).

5. The method of claim 3, wherein:
  step (d) occurs prior to step (c); and
  the further fragment is not re-transmitted when step (c) is performed.

6. The method of claim 3, wherein:
  the one or more fragments are received out of the offset order and
  step (c) comprises retransmitting the buffered group in offset order.

7. The method of claim 3, wherein:
  the buffered further fragment and the one or more other fragments are received out of the offset order; and
  step (g) comprises re-transmitting the one or more other fragments and the buffered further fragment in offset order.

8. A method for processing fragments received at a node in a communication system, the method comprising:
  (a) receiving groups of fragments, wherein:
    (i) each group of fragments corresponds to a different packet that was fragmented into a set of fragments having an offset order corresponding to increasing fragment offset values;
    (ii) each set of fragments comprises an offset-0 fragment and one or more additional fragments; and
    (iii) the offset-0 fragment is the first fragment in the offset order of the set of fragments;
  (b) buffering the groups of fragments;
  (c) analyzing a rule set to match a rule for each buffered group; and
  (d) applying, to each buffered group, the corresponding matched rule to (i) determine whether the buffered group is to be re-transmitted and (ii) if the buffered group is to be re-transmitted, determine how to re-transmit the buffered group, wherein the rule set comprises:
    (A) a first rule stipulating that received fragments corresponding to a single packet are to be at least partially reassembled prior to re-transmission; and
    (B) a second rule stipulating that received fragments corresponding to a single packet are not to be reassembled prior to re-transmission.

9. The method of claim 8, wherein:
  the groups of fragments comprise a first group and a second group; and
  step (c) matches (i) the first rule to the buffered first group and (ii) the second rule to the buffered second group, such that:
    the buffered first group is at least partially reassembled prior to being re-transmitted; and
    the buffered second group is not reassembled prior to being re-transmitted.

10. The method of claim 8, wherein step (c) comprises determining the corresponding matched rule for each buffered group based on information in the offset-0 fragment.

11. The method of claim 8, wherein the first rule comprises:
  a first sub-rule stipulating that the reassembled fragments corresponding to the single packet are to be re-fragmented prior to re-transmission; and
  a second sub-rule stipulating that the reassembled fragments corresponding to the single packet are not to be re-fragmented prior to re-transmission.

12. The method of claim 11, wherein:
  the groups of fragments comprise a first group and a third group; and
  step (c) matches (i) the first rule and the first sub-rule to the buffered first group and (ii) the first rule and the second sub-rule to the buffered third group, such that:
    the buffered first group is at least partially reassembled and then re-fragmented prior to being re-transmitted; and
    the buffered third group is at least partially reassembled, but not then re-fragmented prior to being re-transmitted.

13. The method of claim 8, wherein applying the first rule to a buffered group comprises reassembling at least two of the received fragments of the buffered group to produce at least a portion of the single packet in its intact, pre-fragmented form.

14. A method for processing fragments received at a node in a communication system, the method comprising:
  (a) receiving a set of fragments in a received sequence, wherein:
    (i) the set of fragments corresponds to a packet that was fragmented into the set of fragments having an offset order corresponding to increasing fragment offset values;
    (ii) the set of fragments comprises an offset-0 fragment and one or more additional fragments;
    (iii) the offset-0 fragment is the first fragment in the offset order of the set of fragments;
    (iv) the set of fragments is received out of the offset order; and
    (v) at least one of the additional fragments is received after the offset-0 fragment;
  (b) buffering the set of fragments; and
  (c) then re-transmitting the set of fragments as fragments in the offset order such that none of the fragments are re-transmitted until after all of the fragments in the set have been received and buffered.

15. A method for processing fragments received at a node in a communication system, the method comprising:
  (a) receiving a first fragment, wherein:
    (i) the first fragment corresponds to a packet that was fragmented into a set of fragments having an offset order corresponding to increasing fragment offset values;
    (ii) the set of fragments comprises an offset-0 fragment and one or more additional fragments; and
    (iii) the offset-0 fragment is the first fragment in the offset order of the set of fragments;
  (b) analyzing a rule set to match a rule for the first fragment;
  (c) applying the matched rule to process the first fragment;
  (d) receiving a second fragment corresponding to the packet; and
  (e) applying the matched rule to process the second fragment, wherein the processing of the second fragment is different from the processing of the first fragment.

16. The method of claim 15, wherein the first fragment corresponding to the packet is re-transmitted and the second fragment corresponding to the packet is not re-transmitted.

17. The method of claim 15, wherein the first fragment is re-transmitted in a first manner and the second fragment is re-transmitted in a second manner different from the first manner.

18. A method for processing fragments received at a node in a communication system, the method comprising:
  (a) receiving a first group of one or more fragments, wherein the first group corresponds to a first packet that was fragmented into a first set of fragments;
  (b) analyzing a rule set to match a first rule for the first group;
  (c) applying the matched first rule to process the first group;
  (d) receiving a second group of one or more fragments, wherein the second group corresponds to a second packet that is different from the first packet and was fragmented into a second set of fragments;
  (e) analyzing the rule set to match a second rule for the second group; and
  (f) applying the matched second rule to process the second group, wherein the first group is re-transmitted and the second group is not re-transmitted.

* * * * *